Nov. 14, 1961 T. H. STEARNS ET AL 3,009,010

PRINTED CIRCUIT HARNESS AND CONNECTOR

Filed Feb. 10, 1958 7 Sheets-Sheet 1

Nov. 14, 1961 T. H. STEARNS ET AL 3,009,010

PRINTED CIRCUIT HARNESS AND CONNECTOR

Filed Feb. 10, 1958

7 Sheets-Sheet 2

Thomas H. Stearns
Thomas A. Nalette
*INVENTORS*

Thomas H. Stearns
Thomas A. Nalette
*INVENTORS*

Thomas H. Stearns
Thomas A. Nalette
*INVENTORS*

Thomas H. Stearns
Thomas A. Nalette
*INVENTORS*

Nov. 14, 1961 T. H. STEARNS ET AL 3,009,010

PRINTED CIRCUIT HARNESS AND CONNECTOR

Filed Feb. 10, 1958 7 Sheets-Sheet 7

Thomas H. Stearns
Thomas A. Nalette
*INVENTORS*

3,009,010

PRINTED CIRCUIT HARNESS AND CONNECTOR

Thomas H. Stearns, South Merrimack, N.H., and Thomas A. Nalette, East Pepperell, Mass., assignors to Sanders Associates, Inc., Nashua, N.H., a corporation of Delaware Filed Feb. 10, 1958, Ser. No. 714,401
2 Claims. (Cl. 174—72)

The present invention relates generally to instrument panel wiring and, more particularly, to a printed circuit wiring harness which may be used on an automotive dashboard, for example. As used throughout the specification the term "printed circuit" includes any preformed circuit, such as one formed by screening, photo-etching or die stamping.

The most common practice in wiring instrument panels has been the use of a conventional wiring harness made up of a tightly bound cluster of conductors having branch conductors spliced thereto. Although this arrangement provides a rather rugged assembly, it does have several disadvantages. Among these are the number of manual operations involved in the production of such an assembly, the poor appearance of the finished assembly, and the difficulty of tracing and repairing a failure in the system. A principal disadvantage of such an installation is that it tends to be heavy and lacks flexibility. While modern manufacturing techniques have minimized some of these disadvantages, there is still a need for a wiring harness that will lend itself to simplified installation and servicing. The present invention is directed to an improvement in the art of printed circuitry by providing a solution to the above-mentioned problems. While the invention is subject to a wide range of harness wiring applications, it is especially suited for use in automotive dashboard wiring and, for convenience, will be particularly described in that connection.

It is an object of this invention, therefore, to provide in printed circuit form an improved unitary wiring harness.

Another object of this invention is to provide an improved printed circuit automotive dashboard wiring harness having terminals integrally formed with the conductors.

A further object of the present invention is to provide an inexpensive printed circuit automotive dashboard wiring harness.

An additional object of the present invention is to provide a printed circuit automotive dashboard wiring harness of light weight and improved flexibility.

Another object of the present invention is to provide a printed circuit automotive dashboard wiring harness embodying a simplified, inexpensive terminal design.

A still further object of the present invention is to provide a printed circuit automotive dashboard wiring harness of improved current carrying capacity.

In accordance with the invention, the wiring harness comprises a unitary, flat circuit having a planar main conductor of uniform thickness. The conductor is encapsulated within a plastic insulating material and is proportional in width to the maximum current load. A plurality of branch conductors divide out of the main conductor and are integrally formed with and extend from the main conductor to provide a predetermined circuit configuration. Integrally formed with the branch conductors are terminals adapted for use in making solderless connections to the electrical apparatus of the automotive dashboard.

For a better understanding of the present invention together with other and further objects thereof, reference is made to the following description taken in connection with the accompanying drawings and its scope will be pointed out in the appended claims.

In the drawings:

FIGS. 1*a* and 1*b* show a plan view of an automotive wiring harness embodying the present invention;

Figure 1A:
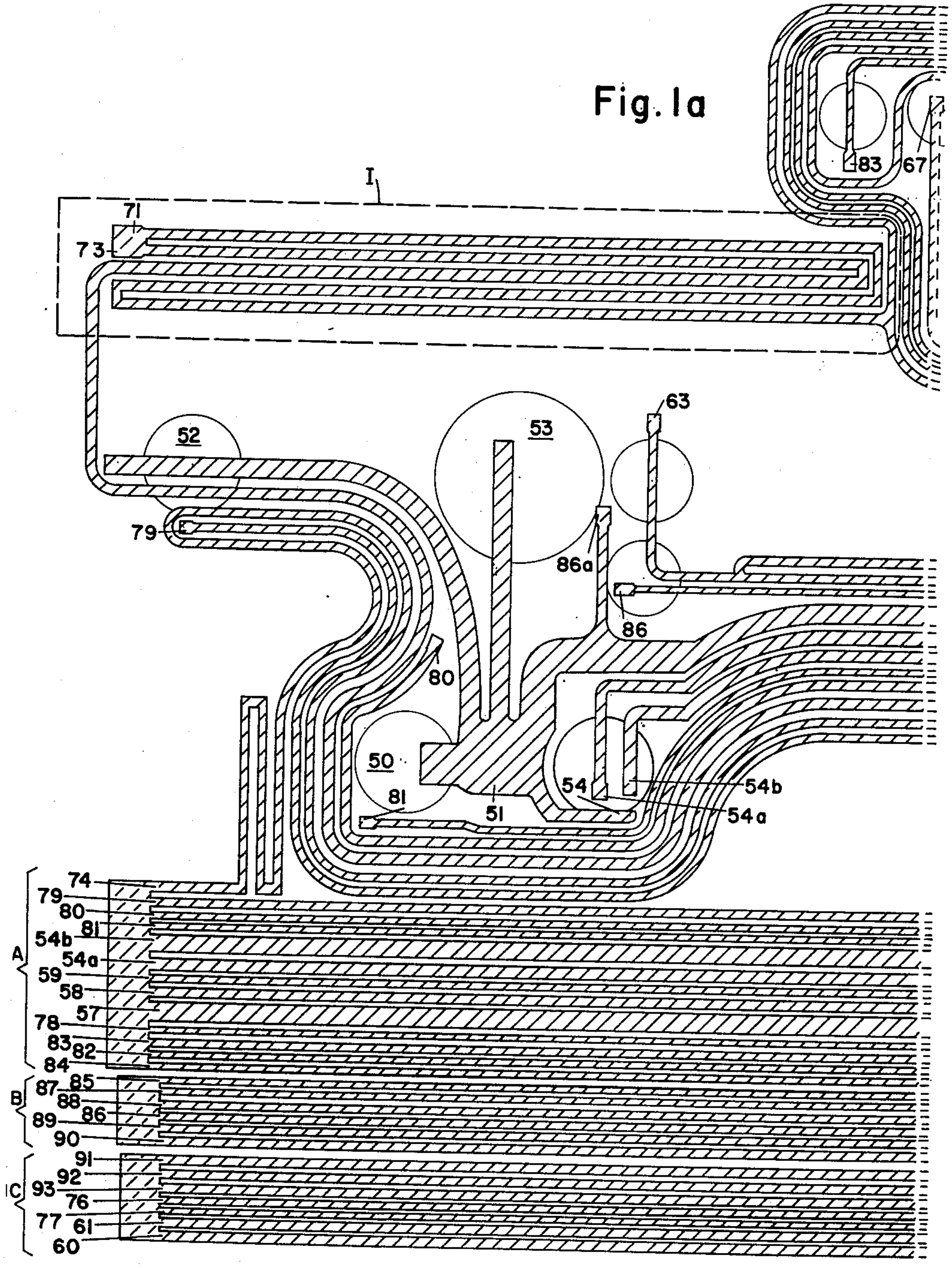
Figure 1B:
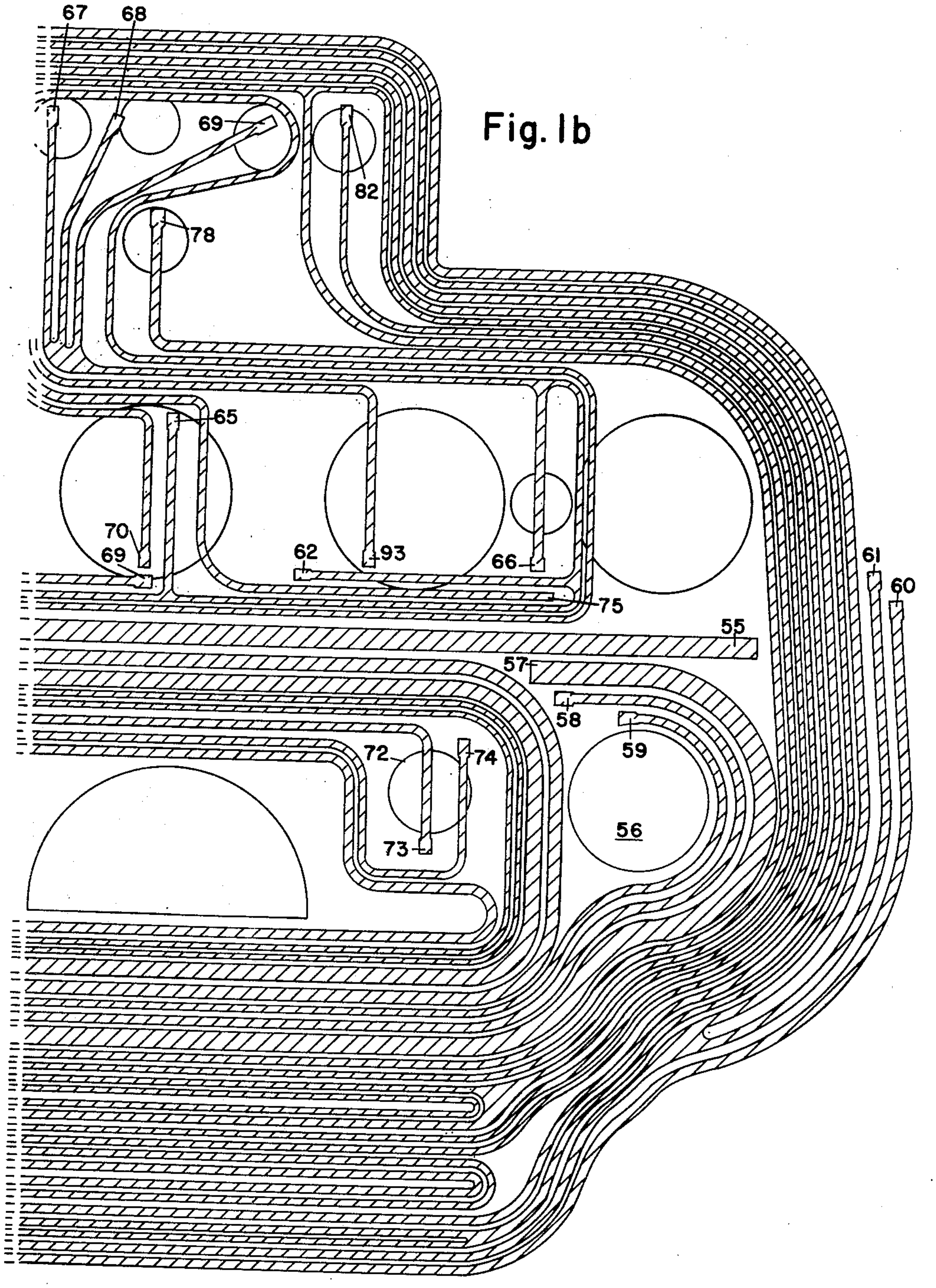

Referring now to the drawings and with particular reference to FIG. 1A and FIG. 1B there is here shown the harness for wiring an automotive dashboard. This circuit is laid out using the ignition switch connection 50 as a reference point.

The main conductor 51 then branches out to supply energy for the windshield wipers 52, the temperature gauge and auxiliary power 53, the blower for the heater 54 and the fuel gauge and auxiliary power 55.

A secondary reference point and energy source is the headlight switch connection 56. This comprises the headlamp conductor 57, the parking light conductor 58, and the stop light conductor 59. Also utilizing the headlight switch as an energy source is the tail light and license plate light conductor 60, the domelight conductor 61, and the energizing lead 62. The energizing lead 62 supplies current to the temperature gauge and oil pressure gauge light 63, the radio light 64, the clock light 65, the ammeter and fuel gauge light 66, and the speedometer lights 67, 68, and 69. The domelight lead 61 in turn acts as an energy source for the clock 70 and map light 71. Since the map light is not grounded, the map light switch 72 is used as a make and break in the map light ground conductor 73. Also utilizing the map light switch 72 as a source of ground is the right door ground conductor 74. Additional utilization of the map light switch 72 is made by the attachment of a lead 75, which acts as a ground conductor for the left door switch 76 and the domelight 77. Completing the fire wall group of conductors A is the high beam indicator 78, the temperature gauge sender 79, the starter solenoid conductor 80, the coil resistor conductor 81, the left turn signal indicator 82, the right turn signal indicator 83 and the stop interlock 84.

Comprising the steering column group of conductors B is the stop light conductor 85, from the stop interlock 84; the flasher 86, which receives power from conductor 55; the left turn **86*a* extending in turn from conductor 55; the left turn signal 87 and right turn signal 88, which are coupled respectively to left turn signal indicator 82 and right turn signal indicator 83; and rear turn signals 89 and 90**.

Completing the knee wall group of conductors C is the left turn signal light conductor 91, from conductor 90 above, the right turn signal light conductor 92, from 89 above, and fuel gauge sender 93.

Figure 2:
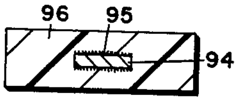
FIG. 2 is an elevational view of a cable conductor illustrating, in cross section, the structure of the conductor, showing in particular the oxide coating and the plastic insulation.

In one embodiment of the present invention the circuit comprises a planar foil-like copper conductor, as, for example, ten thousandths (0.010) of an inch or less, encapsulated within a plastic insulating material. Typically, the conductor is of uniform thickness and is proportional in width to the maximum current load. Adherence between the copper conductor and the insulating material may be affected by forming a black cupric oxide coating on the surface of the copper by means of oxidation in a chemical bath. FIG. 2 illustrates such a structure in cross section showing the copper conductor 94, the cupric oxide coating 95 and the plastic insulating material 96. Methods of laminating copper to plastic materials will be pointed out more fully hereinafter.

Figure 3:
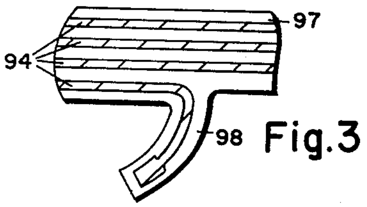
FIG. 3 is a plan view of a conductor group illustrating a substantially rigid conductor with a flexible branch.

The circuit may be entirely flexible or, as illustrated in FIG. 3, it may have a substantially rigid portion 97 with flexible branches 98. A unique feature of this printed circuit-type wiring harness is that the branch conductors smoothly divide out of the main conductor and are integrally formed with the main conductor, i.e., there are no splices or junctions between conductors. This permits a high conductor density with unusual ease of repair.

Figure 4:
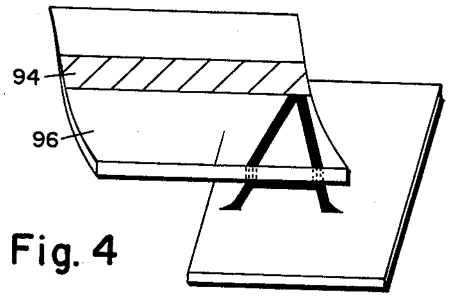
FIG. 4 is a perspective view illustrating the use of transparent insulation material.
Figure 5:
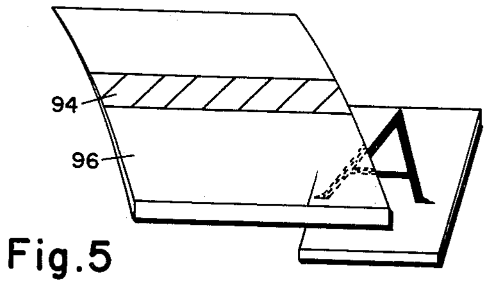
FIG. 5 is a perspective view illustrating the use of translucent insulation material.
Figure 6:
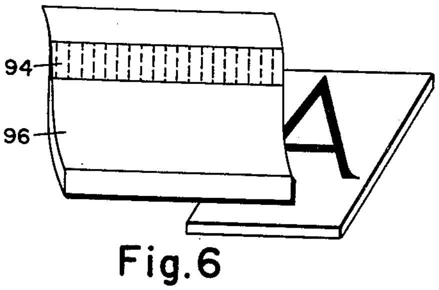
FIG. 6 is a perspective view illustrating the use of colored insulation material.

Another feature of this design is that the insulating material may be transparent, as illustrated in FIG. 4, or translucent, as illustrated in FIG. 5. It may also be colored or colored in part, as illustrated in FIG. 6. There is also a technique which may be used to color the conductors themselves. This involves tinting the oxide coating. These features may be combined in any fashion to provide markings as an aid in installation and servicing.

Figure 7:
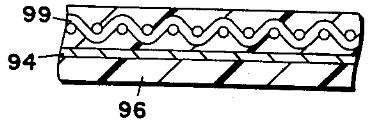
FIG. 7 is a view illustrating, in cross section, the use of flexible fabric reinforcement in the insulating material.

FIG. 7 is illustrative of the fact that a flexible fabric reinforcement 99 may be used in the insulating material 96.

Figure 8:
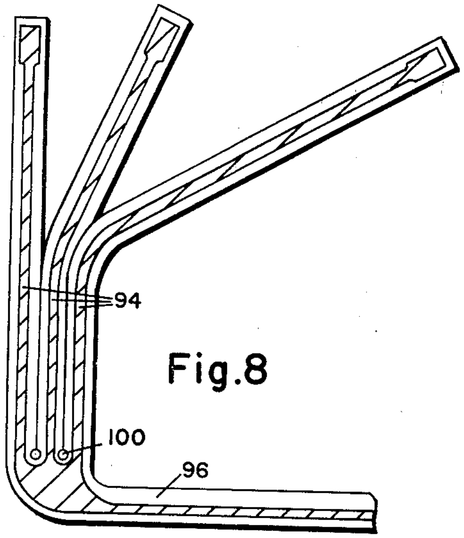
FIG. 8 is a plan view illustrating reinforcement of the insulating material by embossing the surface thereof.

Another method of reinforcing the insulating material is illustrated in FIG. 8. Here the plastic is embossed in critical areas as indicated by the cross-hatching. This improves tear resistance of the cable. Another feature illustrated in this figure in the use of small holes 100 to improve the tear resistance where an acute angle is formed in severing the individual conductors or trimming out scrap.

Figure 9:
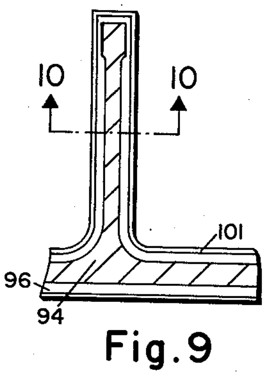
FIG. 9 is a plan view illustrating the use of beaded edges on the insulating material to improve tear resistance.
Figure 10:
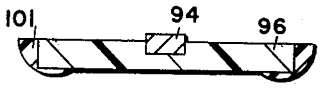
FIG. 10 is a view, in cross section, taken along the line 10—10 in FIG. 9.

Still another method of improving tear resistance is illustrated in FIG. 9. Here a beaded edge 101 is provided in the critical areas.

Figure 11:
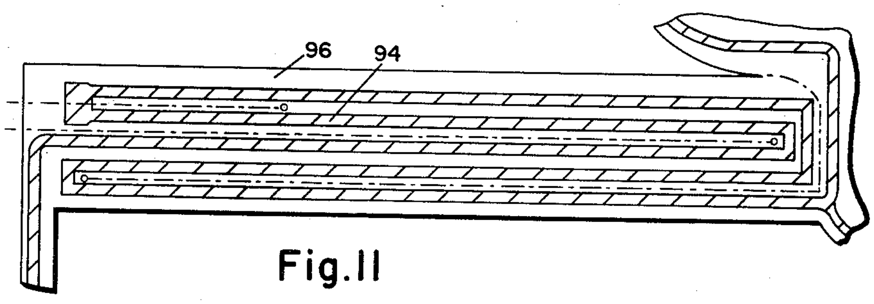
FIG. 11 is a plan view of a planar conductor configuration used in forming an extended continuous linear conductor.
Figure 12:
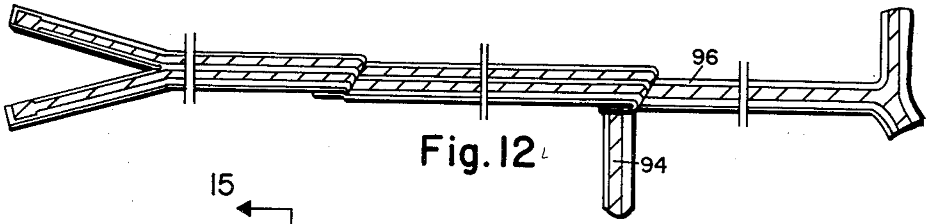
FIG. 12 is a perspective view illustrating an extended continuous linear conductor after the cutting and folding of the conductor of FIG. 11.
Figure 14:
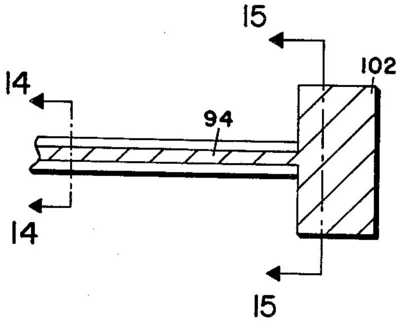
FIG. 14 is a view, in cross section, taken along the line 14—14 in FIG. 13.
Figure 15:
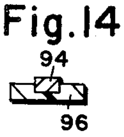
FIG. 15 is a view, in cross section, taken along the line 15—15 in FIG. 13.

Referring now to FIG. 11, there is here illustrated an enlarged view of the area encompassed within the dotted line indicated by I of FIG. 1. The planar pattern here is used to provide a continuous linear conductor. When the insulation between the conductor is severed as indicated by the dashed lines, the conductor may be folded and extended, as illustrated more specifically in FIG. 12.

A very desirable feature of the present invention is its adaptability to use with a wide variety of terminal designs integrally formed with the conductors.

Figure 13:
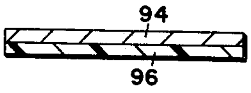
FIG. 13 is a plan view of an unformed terminal structure used in the present invention.
Figure 16:
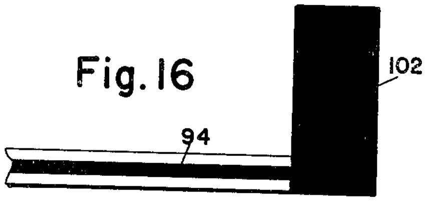
FIG. 16 is a view illustrating an alternative embodiment of the unformed terminal structure of FIG. 13.
Figure 17:
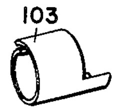
FIG. 17 is a perspective view illustrating forming of the terminal of FIG. 13 into its final shape.
Figure 18:
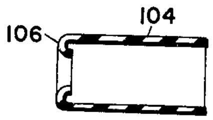
FIG. 18 is a view, in cross section, of the elastic sleeve used to surround the terminal of FIG. 13 after it has been shaped.
Figure 19:
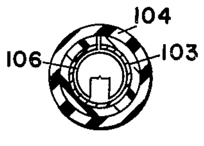
FIG. 19 is a view of a lateral cross section of the completely formed terminal assembly.
Figure 20:
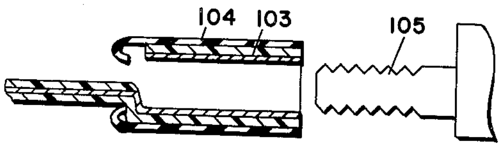
FIG. 20 is a view of a longitudinal cross section of the completely formed terminal assembly, illustrating its use in engaging a threaded stud.

FIGS. 13–20, inclusive, illustrate a terminal design wherein the conductor end is formed into a flat, rectangular sheet and cleared of insulation on one surface. This rectangular area 102 may be positioned relative to the conductor 94 either as illustrated in FIG. 13 or as shown in FIG. 16. The terminal is then rolled into a form of a cylinder 103, as illustrated in FIG. 17, and inserted into the elastic sleeve 104 of FIG. 18. The uninsulated surface of the area 102 should form the inside area of the cylinder 103. This assembly may then be typically used to engage a threaded stud 105, as more specifically illustrated in FIG. 20. The expansion of the cylinder 103 within the sleeve 104 prevents inadvertent withdrawal of the cylindrical terminal 103 from the sleeve 104, since the cylinder 103, as it tends to expand, will engage the rolled lip 106 of the sleve 104.

Figure 21:
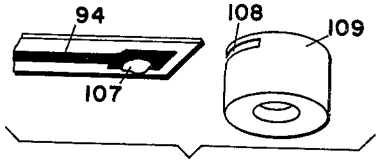
FIG. 21 is an exploded view in perspective of another terminal embodiment.
Figure 22:
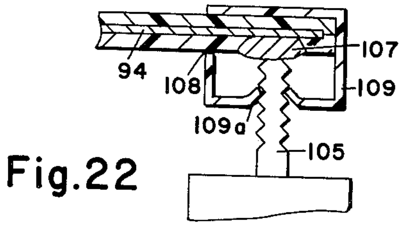
FIG. 22 is a lateral cross sectional view of the terminal embodiment of FIG. 21 illustrating engagement with a threaded stud.

Another method of terminating a conductor so as to suitably engage a threaded stud is illustrated in FIGS. 21 and 22. In this terminal embodiment, engagement with the stud is made perpendicular to the face of the conductor. Conductor 94 is bared and subsequently plated or coated with solder 107. The coating 107 acts as an antioxidant and a deformable base. This may then be inserted through a slot 108 in a plastic sleeve 109 that is designed to engage the stud 105. The rolled edge **109*a* of the plastic sleeve 109 prevents undesired withdrawal of the sleeve and aids in maintaining good contact between the stud 105 and the deformable solder bead 107**.

Figure 23:
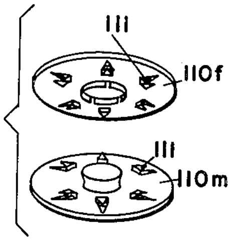
FIG. 23 is a perspective view of male and female portions of a rivet-type gripper connector.
Figure 24:
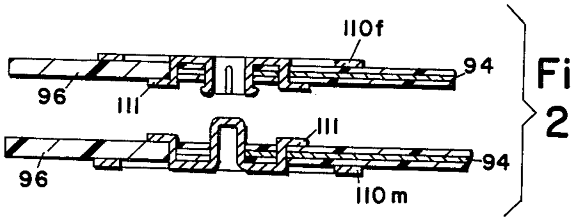
FIG. 24 is a view, in cross section, illustrating the use of the connector of FIG. 23 with the circuit of the present invention.
Figure 25:
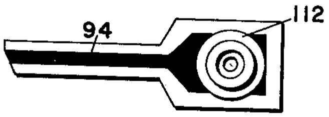
FIG. 25 is a plan view illustrating the use of a two-piece, rivet-type, male connector with a conductor terminal.
Figure 26:
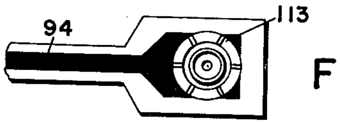
FIG. 26 is a plan view illustrating the use of a two-piece, rivet-type, female connector with a conductor terminal.
Figure 27:
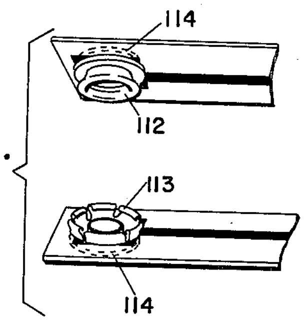
FIG. 27 is an exploded view, in perspective, illustrating the mating of the male and female connectors of FIGS. 25 and 26.
Figure 28:
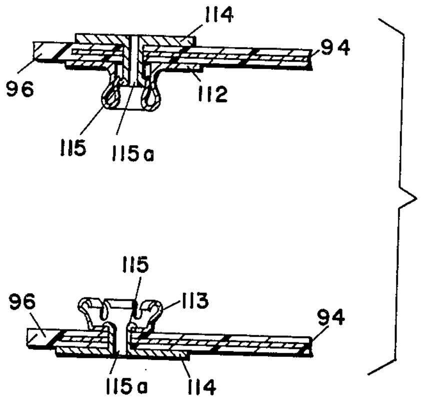
FIG. 28 is a cross sectional view of the male and female connectors of FIGS. 25 and 26 used with the circuit of the present invention.

Another rather inexpensive type terminal that may be readily used with this invention is illustrated in FIGS. 23 and 24. This comprises a rivet-type, connector 110 which may be punched through a conductor and clinched by means of prongs 111. The male and female portions are designated by the subscripts *m* and *f* respectively. A desirable feature of this terminal design is that it obviates the step of removing the insulation above the conductor, as adequate electrical contact is made when the rivet is driven through the conductor.

A terminal design similar to that illustrated in FIGS. 23 and 24 is shown in FIGS. 25–28, inclusive. Illustrated here is a connector having a male member 112 and a female member 113. Both the male member 112 and the female member 113 comprise a two-piece rivet structure. The first portion 114 of this structure is driven through the insulation material and the conductor 94, making electrical contact therewith. The male or female member 112 or 113 is then placed over the first portion 114 and is clinched thereto by means of a conical finger, not shown, which is driven into the orifice 115a to spread the lip 115 of the first rivet portion 114. This particular connector design is very tenacious and provides a good electrical contact, and, like the previous connector embodiment, it may be used without removing the insulation from any part of the conductor surface.

Figure 29:
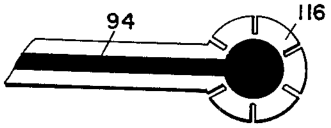
FIG. 29 is a plan view illustrating the use of a molded plastic connector made integral with a conductor terminal.
Figure 30:
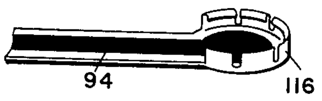
FIG. 30 is a perspective view illustrating the use of a molded plastic connector made integral with a conductor terminal.

Still another terminal design is illustrated in FIGS. 29 and 30. In this embodiment, the plastic material 116 surrounding the conductor end is molded to form a gripper-type terminal connector. This same concept of utilizing the plastic surrounding the conductor end as a molded connector, could be applied to the embodiment of FIG. 22 to mold the casing 108 as an integral portion of a conductor insulation.

Figure 31:
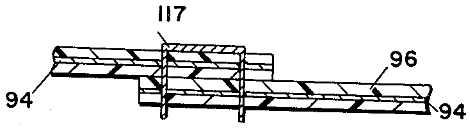
FIG. 31 is a view, in cross section, illustrating a step in the method of repairing a broken conductor.
Figure 32:
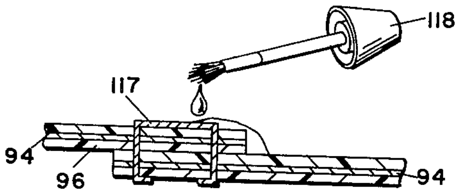
FIG. 32 is a view, in cross section, illustrating a further step in repairing a broken conductor.
Figure 33:
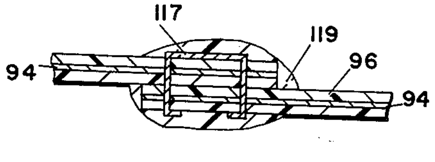
FIG. 33 is a view, in cross section, illustrating a completed repair of a broken conductor.

Another unique property of the circuit of the present invention is the ease with which it may be repaired without the use of solder. The steps in making such a repair are illustrated in FIGS. 31–33, inclusive. After a break is located, the conductor is lapped as shown, and clinched with a conductive staple 117. The joint may then be insulated by the application of a plastic material such as, for example, a highly plasticized solution of polyvinyl acetate in a suitably volatile solvent. This may be daubed on by means of a small brush 118 of the type used in applying fingernail polish. Upon evaporation of the solvent, a flexible insulating coating 119 will be formed about the staple and the joint.

To illustrate, more completely, the methods and types of materials that may be used to manufacture the article of this invention, there follows several examples of bonding copper to plastic materials.

TRI-FLUORO-CHLORO-ETHYLENE—COPPER CIRCUIT

Figure 34:
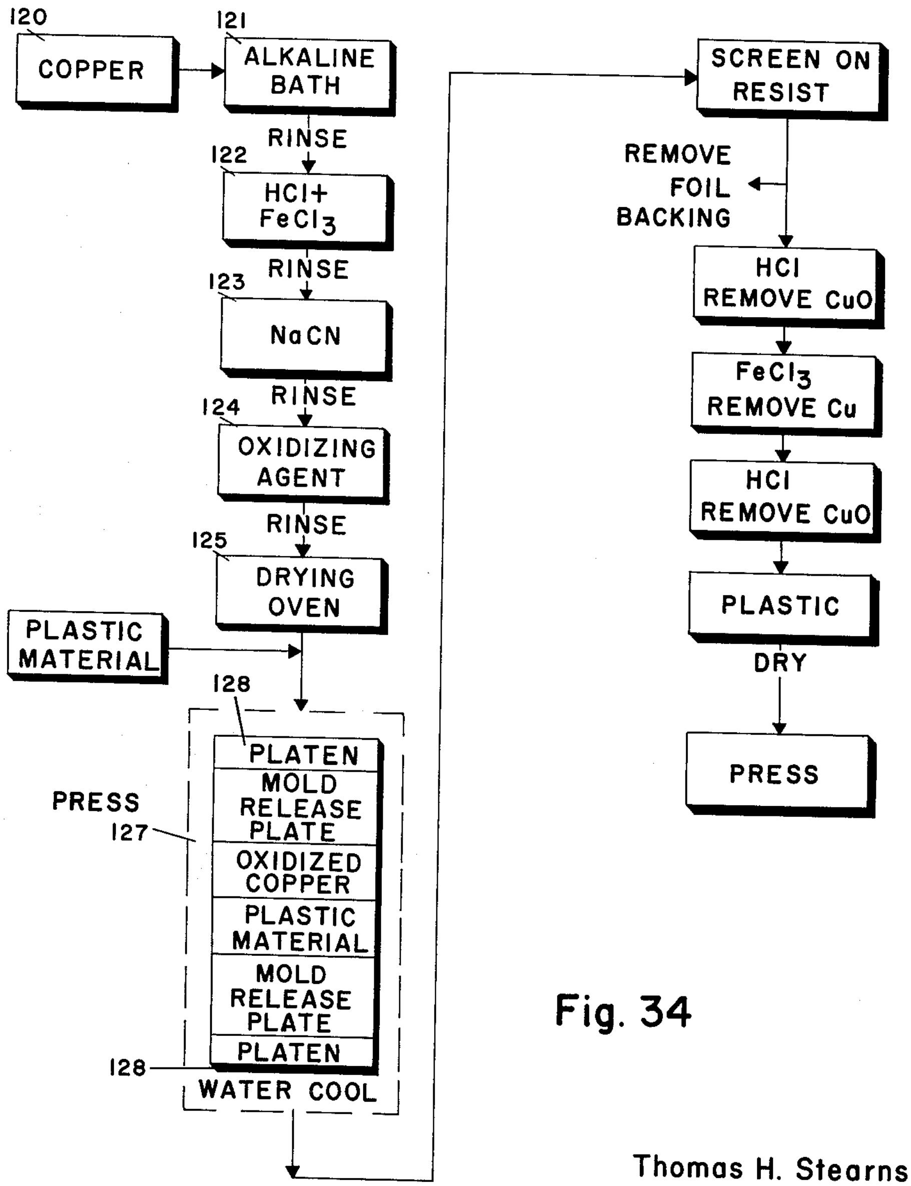
FIG. 34 is a flow chart illustrating a preferred process for manufacturing the article of the present invention.

Referring now to FIG. 34, a flow chart for a method of manufacturing a printed circuit automative dashboard wiring harness is illustrated using a plastic such as tri-fluoro-chloro-ethylene. The method is carried out in detail in the following manner:

Sheets of copper 120 are:

(1) Immersed in a mild alkaline bath 121, such as Dy-Clene EW Metal Cleaner, as manufactured by MacDermid, Inc., of Waterbury, Connecticut, for five seconds;

(2) Rinsed in cold, running water for five seconds;

(3) Dipped for 15 seconds in a 10 percent solution of hydrochloric acid (HCl) 122 containing a small amount of ferric chloride ($FeCl_3$);

(4) Rinsed in cold, running water for five seconds;

(5) Immersed in a 10 percent solution 123 of sodium cyanide (NaCN) for 15 seconds and then rinsed:

(6) Immersed for 10 minutes at 190° F.–210° F. in an oxidizing agent 124, such as an aqueous solution of 1½ pounds of Ebonol "C" Special, as manufactured by Enthone, Inc., New Haven, Connecticut, per gallon of water. The oxidizing agent is preferably a hot aqueous solution consisting essentially of an alkali selected from the group consisting of sodium hydroxide and potassium hydroxide and a chlorite selected from the group consisting of sodium chlorite and potassium chlorite.

(7) Immersed in cold, running water;

(8) Rinsed in hot, running water for 10 to 20 seconds; and (9) Baked in a preheated oven 125 at a temperature above 212° F. until all traces of moisture are removed.

These steps result in providing a sheet of copper having a cupric oxide surface obtained by utilizing a chemical agent rather than by applying heat as in prior art. The cupric oxide obtained in the manner described in Steps 1 to 9 above is quite different from that obtained by heating. It appears as a homogeneous, velvety black coating. The black is intense. Under a microscope of greater than 300 power, the crystals of oxide appear fine and needle-like and in a much thinner layer than that obtained when copper is heated. Further, and probably most important, this cupric oxide differs from that obtained by heating in that it is tightly bonded to the copper and will not flake off.

The copper sheets obtained by means of Steps 1 to 9 above are now ready for lamination to a plastic. The lamination process is, for example, as follows:

(10) For use as a mold release plate, place a sheet of thin, metallic-foil, such as aluminum foil, on the platen of a press 127, such as manufactured by Wabash Press Company, Wabash, Indiana; the aluminum foil is used to prevent adherences between the tri-fluoro-chloro-ethylene and the platen;

(11) Place a lamination of a sheet of plastic material on the platen 128 of the press 127. This lamination may have as many layers as desired, for reasons to be considered more fully hereinafter. The plastic may be, for example, tri-fluoro-chloro-ethylene and each sheet may be, for example, 6 inches long, 2 inches wide and 2 mils thick. The temperature of the oven is, for example, 400° C.

(12) Place a sheet of copper, coated in accordance with Steps 1 to 9 on top of a tri-fluoro-chloro-ethylene layer of the laminate and apply an initial pressure of approximately 5 pounds per square inch, gradually increasing the pressure;

(13) Bake under pressure at 216° C. to 219° C. for 40 seconds;

(14) Remove the copper clad plastic from the press and quench in cold water; and

(15) Remove the aluminum foil.

This process provides a copper-clad plastic article which may be used for fabricating the article of this invention or for any of a number of purposes. Though definite pressures and temperatures are mentioned above, the pressures, times and temperatures are interrelated and vary also with the thickness, area and type of plastic material used. Generally, the temperature is in the range of 215° C. to 300° C., the initial pressure being of the order of 5 pounds per square inch, but building up to higher pressures which may be of the order of hundreds of pounds per square inch. The parameters are time-temperature, primarily and, to some degree, time and temperature, in terms of the pressure applied, may be interchanged.

The plastic can, of course, be copper clad on both sides merely by placing sheets of copper both above and below the plastic. Similarly, a number of sheets of plastic may be intermixed with cupric oxide coated sheets of copper to form a laminated structure.

Another method for effecting the bond involves the use of a rotary press. The rollers are heated to a temperature of 215° C. to 250° C. and thermostatically maintained. The copper-plastic bond is effected by covering a sheet of plastic, such as tri-fluoro-chloro-ethylene with two sheets of cupric oxide coated copper and introducing the composite article between the rollers. Preferably, the rollers are spaced so as to apply a positive pressure greater than 5 pounds per square inch, and are rotated at such a rate as to provide a linear speed of, for example, 10 inches per minute, to the sheets.

A modified form of the improved method of bonding tri-fluoro-chloro-ethylene to copper involves the use of powdered tri-fluoro-chloro-ethylene which is spread on top of a sheet of cupric oxide covered copper. For unplasticized powder of high molecular weight, the operating temperature range may be as high as 300° C. After placing the powder in contact with the copper (and, if desired, applying another sheet of copper on top of the powder), the press is closed at the rate of 0.2 inch per minute until the desired thickness is obtained as determined by gauge blocks. By shining a light through the material, a color change will be observed from pink to white. After the white light appears, the press is held in place for 15 to 30 seconds, depending upon the thickness of the material desired. The composite sheet thus obtained is then quenched in cold water or transferred to a cold press. In both processes immediate quenching produces crystallization and thus, a relatively high degree of transparency. Other layers of plastic can be added as desired.

The bond strengths obtained as measured by delaminating a one inch strip of copper from the tri-fluoro-chloro-ethylene are consistently greater than 8 pounds per inch. Bond strengths of 18 pounds per inch and higher are obtainable. For example, laminates prepared by starting with the tri-fluoro-chloro-ethylene powder as indicated above are characterized by bond strengths which are consistently in excess of 15 pounds per inch.

To manufacture a component of an electric circuit, as is the article of this invention, the copper of the article prepared in the manner described above may be treated as indicated in the remainder of the flow chart of FIG. 34. A resist is placed on the copper in the pattern of a desired configuration and the excess removed by a suitable etching technique. The remaining resist is removed and the circuit may then be encapsulated by placing a sheet of plastic in contact with the coated copper and sealing by means of pressure in the manner described above.

TETRA-FLUORO-ETHYLENE—COPPER CIRCUIT

Using the same apparatus and general procedure as outlined in FIG. 34, and differing only in the plastic to copper bonding process, a thin sheet of Teflon, for example under .010 inch thick, is placed in contact with a sheet of cupric oxide coated copper foil, for example 2 ounce (2.7 mil) copper, and placed in the press 127. The plastic-copper laminate is preheated at approximately 700° F. for several minutes and then pressed at that temperature and in order of 250 pounds per square inch pressure for about 6 minutes. The laminate is then water cooled in the press under continued pressure. Bond strengths have been observed as high as 8 pounds per inch.

A number of compounds which typify large classes of plastic materials have been laminated to cupric oxide coated copper in the manner suggested above. The temperature, pressure, preheat time under slight pressure, heating time under pressure, the thickness of copper used, the thickness of the plastic and the resultant peel strengths are tabulated on the following page for a number of materials utilized.

The plastic-copper bonding mechanism is not thoroughly understood. However, as a result of much experimentation and analysis, it is believed that the bonding mechanism is essentially mechanical. One basic requirement seems to be that the plastic material must flow fairly readily without decomposing. As indicated in the following table, some of the materials tend to decompose before the desired melt-viscosity is reached even though a satisfactory bond may still be obtained. In the case of some forms of Teflon, the degree of plasticity increases with temperature but the material tends to decompose before it reaches a suitable flow point. It will be apparent, however, that while a degree of flow is necessary to cause the plastic material to fill the interstices formed by the cupric oxide needles, more or less randomly oriented, a good bond is obtainable even though ideal flow conditions are not realized. In the case of the polyvinyl material it has been frequently observed that the bond is stronger than the plastic material itself. Thus, for polyvinyl chloride and polyvinyl acetate the peel strength is indicated to be of the order of 3000 grams. This is the pulling force at which the plastic material broke.

*Parameters for bonding copper to plastic*

| | Temp. of materials (° C.) | Pressure (lbs./in.)[2] | Time of preheat (min.) | Min. time in press (min.) | Thickness of copper ($10^{-3}$ in.) | Thickness of plastic ($10^{-3}$ in.) | Peel strength (grs./in.) |
|---|---|---|---|---|---|---|---|
| Ethylenes: | | | | | | | |
| Polyethylene | 127 | 70–80 | 1 | 4 | 1.35 | ---------- | [1] >3,000 |
| Kel-F | 234 | 120–150 | 5 | 6 | 1.35 | 10 | 4,200 |
| Teflon[2] | 380 | 120–150 | 5 | 6 | 2.70 | 10 | 1,650 |
| Vinyls: | | | | | | | |
| Polyvinyl chloride | 220 | 120–150 | 1 | 4 | 1.35 | 10 | 3,100 |
| Polyvinyl butyral | 193 | 120–150 | 1 | 4 | 2.70 | 8.5 | 3,300 |
| Polyvinyl acetate | 200 | 120–150 | 1 | 4 | 2.70 | 10 | 3,100 |
| Polyvinyl alcohol[2] | 205 | 325–350 | 1 | 4 | 2.70 | 11 | 5,500 |
| Saran: | | | | | | | |
| Polyvinylidene chloride | 180 | 120–150 | 1 | 4 | 2.70 | 12 | [3] |
| Polyvinylidene styrene | 205 | 120–150 | 5 | 6 | 2.70 | 31 | 2,500 |
| Polyamides: Nylon NC–10[2] | 250 | 325–350 | 5 | 6 | 1.35 | Crystals | 4,000 |
| Cellulosics: Cellulose acetate[2] | 193 | 120–150 | 1 | 4 | 2.70 | 30 | 7,260 |
| Acrylics: Methyl methacrylate (Plexiglas)[2] | 250 | 325–350 | 5 | 6 | 2.70 | 66 | 2,000 |
| Rubber hydroxide[2] | 122 | 120–150 | 1 | 4 | 1.35 | 9 | Decomposes |

1 Tearing of polyethylene.
2 Press—water cooled.
3 Turned brown—tearing of material at 1,500 grams.

Another method of manufacturing the article of the present invention includes forming the plastic coated copper article as illustrated in the left hand column of the flow chart of FIG. 34, but stamping out or die cutting the final circuit. This method is quicker in mass production of a given circuit than printing or screening with a resist, and amortization of the cost of the die may usually be effected in a short period of time.

The circuit of FIG. 1A and FIG. 1B is adaptable to manufacture by a stamping process. In fact the conductors forming groups A, B, and C could very effectively be separated by means of a clicker die. Another feature of the stamping technique is that it facilitates mechanical reinforcement of a given circuit since a die may be designed to cut out only selected portions of the scrap, leaving other portions to reinforce critical areas.

The present invention represents an important step forward in the art of printed circuitry in that the flexibility properties of plastic materials may be successfully utilized in combination with techniques of printed circuitry to produce electrical articles of superior characteristics.

While there has been described what are at present considered to be the preferred embodiments of this invention, it will be obvious to those skilled in the art that various changes and modifications may be made therein without departing from the invention, and it is, therefore, aimed in the appended claims to cover all such changes and modifications as fall fairly within the true spirit and scope of the invention.

What is claimed is:

1. A printed circuit wiring harness, comprising: a unitary, flat, flexible printed circuit having a planar, main, copper conductor coated with black cupric oxide, said conductor being of a uniform thickness less than 0.010 inch and proportional in width to the maximum current load; a plurality of branch cupric oxide coated copper conductors dividing out of said main conductor and integrally formed with and extending from said main conductor to provide a predetermined circuit configuration, each of said conductors being encapsulated within a plastic insulating material; and a terminal integrally formed with a branch conductor, said terminal being solder coated to form an anti-oxidant surface and a deformable base, a male connector, a sleeve having said terminal insertable therein, said sleeve receiving and maintaining said male connector in electrical contact with said solder coated terminal.

2. A terminal for a printed circuit wiring harness, comprising: a unitary, flat, flexible printed circuit end having an encapsulated planar conductor exposed in part; and a cylindrical terminal housing member having an opening in the side wall thereof receiving said circuit end with the exposed portion of said conductor being within said housing member; a serrated male terminal member, said housing member mating with said terminal member for and electrically connecting said exposed area.

References Cited in the file of this patent

UNITED STATES PATENTS

| | | |
|---|---|---|
| 1,765,734 | O'Neill | June 24, 1930 |
| 1,794,831 | Caruso | Mar. 3, 1931 |
| 2,299,140 | Hanson | Oct. 20, 1942 |
| 2,712,591 | Rogell | July 5, 1955 |
| 2,716,623 | Tator | Aug. 30, 1955 |
| 2,730,473 | Batezell | Jan. 10, 1956 |
| 2,854,502 | Richter | Sept. 30, 1958 |
| 2,876,393 | Tally et al. | Mar. 3, 1959 |
| 2,932,599 | Dahlgren | Apr. 12, 1960 |
| 2,939,905 | Canfield | June 7, 1960 |

FOREIGN PATENTS

| | | |
|---|---|---|
| 715,207 | Great Britain | Sept. 8, 1954 |